UNITED STATES PATENT OFFICE.

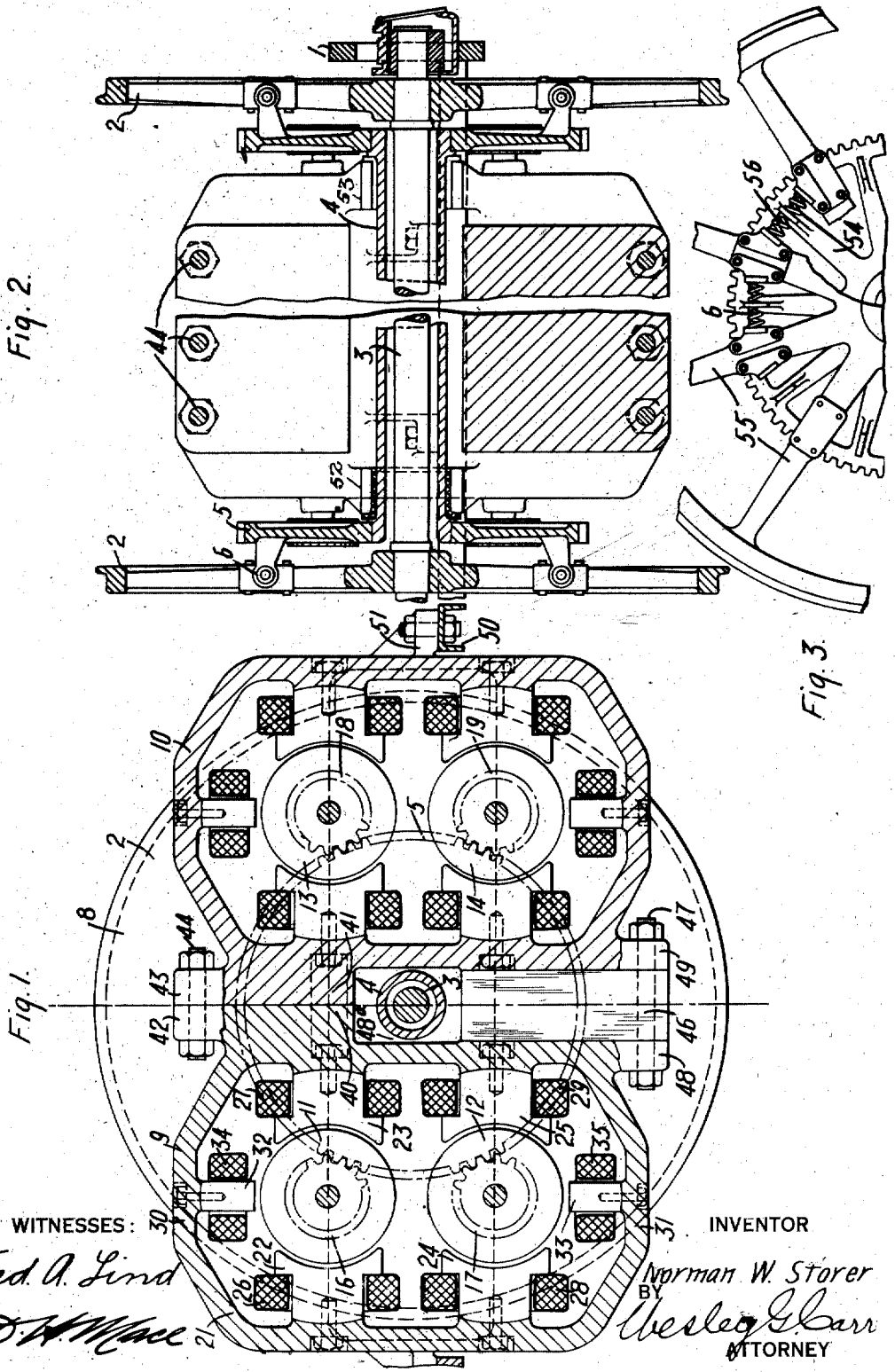

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

LOCOMOTIVE.

1,252,052.  Specification of Letters Patent.  Patented Jan. 1, 1918.

Application filed August 10, 1915. Serial No. 44,811.

*To all whom it may concern:*

Be it known that I, NORMAN W. STORER, a citizen of the United States, and a resident of Pittsburgh, in the county of Allegheny and State of Pennsylvania, have invented a new and useful Improvement in Locomotives, of which the following is a specification.

My invention relates to electric locomotives, and it has special reference to locomotives that are provided with so-called quill drives.

One object of my invention is to provide a locomotive of the above-indicated character which shall be simple, compact and durable in construction and shall embody a pair of twin driving motors that are rigidly secured together and have a single magnetic path for their several armatures, all of which are mechanically associated with a single quill which is disposed in an opening intermediate said motors and is resiliently associated with the driving wheels.

Another object of my invention is to provide a single driving unit which shall comprise a pair of twin motors disposed in side-by-side relation and each embodying a pair of armatures, the motors being rigidly bolted together at the top and having a removable intermediate block of magnetizable material between the bottom portions thereof, and field magnet projections associated with the several armatures and adapted to provide a single magnetic path for said armatures.

My invention is best understood by reference to the accompanying drawing, in which Figure 1 is a view, partially in section and partially in end elevation, of a portion of a locomotive constructed in accordance with my invention; Fig. 2 is a view, partially in section and partially in side elevation, of the structure shown in Fig. 1, and Fig. 3 is a side elevation of a portion of the driving mechanism shown in Figs. 1 and 2.

Referring to the drawing, the apparatus shown comprises side frames 1, a plurality of driving wheels 2, an axle 3, a quill 4, a plurality of gear wheels 5, flexible driving connections 6 between the gear wheels and the adjacent driving wheels, and a driving unit 8 comprising a pair of twin motors 9 and 10 that are disposed on opposite sides of the axle 3 and quill 4 and are respectively provided with armatures 11 and 12, and 13 and 14 that are connected at both ends to the gears 5 by means of pinions 16, 17, 18 and 19, respectively.

The twin motors 9 and 10 are of similar construction, and, therefore, only one of them will be described in detail. The twin motor 9, for instance, embodies the two armatures 11 and 12 that are disposed vertically, the one over the other, and are inclosed by a single magnetizable frame 21 which completely surrounds the armatures and is provided with two sets of main polar projections that respectively comprise projections 22 and 23, constituting the upper set, and 24 and 25, constituting the lower set. Said polar projections 22, 23, 24 and 25 are surrounded and magnetized by field-magnet windings 26, 27, 28 and 29, respectively. Coöperating with the end portions 30 and 31 of the twin motor 9 are commutating polar projections 32 and 33 that are respectively provided with field-magnet windings 34 and 35.

In so far as already described, the twin motors 9 and 10 are similar to the structures set forth in my co-pending application, Serial No. 769,204, filed May 22, 1913. The distinctive features of these particular twin motor structures, however, will now be more fully set forth.

The twin motors 9 and 10 are provided with integrally projecting portions 40 and 41 which are located upon the inner adjacent sides thereof and are positioned substantially in the plane of the upper sets of main polar projections 22 and 23. The frames 21 are also provided with upwardly projecting lugs or flanges 42 and 43 through which a plurality of bolts 44 extend for the purpose of rigidly securing together the upper portions of the twin motors 9 and 10. In substantially the plane of the lower sets of main polar projections 24 and 25, is located a removable block 46 of magnetizable material which is rigidly secured in place by means of bolts 47 that project through lugs or flanges 48 and 49 having an integral association with the respective twin motor structures 9 and 10.

The peculiar arrangement and location of parts set forth provide a single main magnetic circuit which threads all of the armatures 11, 12, 13 and 14 and is indicated by the dotted line. By reason, thereof, a particularly compact, light and relatively inexpensive driving unit of large capacity is provided.

Intermediate the several twin motors 9 and 10 and between the coöperating integral projections 40 and 41 and the removable block 46, is an opening 48ª in which is disposed the axle 3 and the surrounding quill 4, and said parts may be removed therefrom by first removing the detachable block 46, thereby providing a pedestal opening which corresponds, in character, to those which are commonly provided in locomotive practice.

The driving unit just described is rigidly supported upon suitable cross-ties 50 by means of integral projections 51 between the respective side frames 1 which may be of any suitable construction.

The axle 3 and quill 4 are concentrically related, and sufficient space is provided between them to permit of slight relative movement, such as is caused by the irregularities and unevenness of the track or rails. The quill 4 is rotatably mounted in a plurality of end bearings 52 and 53, and the respective ends thereof are provided with the gear wheels 5 with which the several armature pinions 16, 17, 18 and 19 mesh, whereby the driving effort of all of the armatures is transmitted through the gear wheels 5.

Each of the gear wheels 5 is provided with laterally projecting arms 54 that extend outwardly between spokes 55 of the corresponding driving wheel 2. Between the spokes 55 and the gear wheel arms 54 are positioned driving springs 56 for the purpose of providing a resilient or yielding driving connection between the gear wheels 5 and the respective driving wheels 2, as has been accomplished in the prior art.

Obviously, my invention is not restricted to the specifical structural details and arrangement and location of parts shown and described, as the benefits thereof may be secured by means of structures differing materially therefrom, but making no departure from the scope and spirit of my invention. I desire, therefore, that only such limitations shall be imposed as are indicated in the appended claims.

I claim as my invention:

1. In a vehicle, the combination with a supporting frame, and a plurality of twin motors rigidly associated together and supported upon said frame as a single driving unit, of a wheel axle and a quill interposed between the parts of said driving unit, a gear wheel fixed to said quill and mechanically associated with the several motor armatures, and a flexible driving mechanism between said gear wheel and said driving wheels.

2. In an electric locomotive, the combination with a running-gear frame, and a plurality of twin motors detachably fixed together and supported upon said frame, of a driving axle and a quill disposed between the two twin motors, means for mechanically associating the several armatures of the twin motors with said quill, and driving wheels associated with said axle and resiliently connected to said quill.

3. The combination with a locomotive frame, an axle and wheels fixed thereto, a quill surrounding said axle and having a gear wheel positioned thereon and resiliently associated with one of said wheels, of a pair of twin motors severally disposed on opposite sides of said axle and said quill and severally provided with a pair of armature shafts and pinions, said twin motors being rigidly secured together and the pinions of the several armatures meshing with said gear wheels.

4. In an electric locomotive, the combination with a running-gear frame, a driving wheel axle and associated wheels, of a pair of twin motors severally disposed on opposite sides of said axle and rigidly bolted together, two armatures for each of said motors, and shell frames provided with pole pieces which are associated with said armatures, said twin motors being supported upon said running-gear frame.

5. In a locomotive, the combination with a running-gear frame, a plurality of twin motors bolted together in side-by-side relation to form a unitary structure and provided with an intermediate opening, said twin motors severally comprising a pair of armatures and being supported upon said frame, of a wheel axle and a quill disposed in said intermediate opening between the two twin motors, wheels associated with the axle and a gear wheel rigidly fixed to said quill and mechanically associated with all of the motor armatures and with one of said wheels.

6. The combination with a pair of twin motors, each comprising a pair of superposed armatures and having corresponding integral portions adapted for abutting engagement, and means for rigidly securing said motors together, of a removable block interposed between said twin motors, and means for bolting said motors and said block rigidly together.

7. A unitary driving unit comprising a pair of twin motors severally having two armatures in superposed relation, a unitary shell frame and a plurality of pole pieces projecting from the unitary shell frame, said twin motors being associated rigidly together to provide a single magnetic circuit for all of the armatures.

8. The combination with a pair of vertically disposed twin motors each comprising a pair of armatures and two sets of vertically disposed polar projections severally positioned on opposite sides of said armatures, of integral projections associated with the several motors adjacent to the upper set of polar projections, a removable magnetizable block interposed between said motors and adjacent to the lower sets of polar projections, and mechanical means for rigidly securing said twin motors together to constitute a unitary structure having a single magnetic circuit for all of the armatures.

9. In a locomotive, the combination with a running-gear frame, an axle and wheels therefor, of a pair of superposed twin motors located on opposite sides of said axle and rigidly associated to provide a single magnetic circuit for all of the armatures, and means for resiliently associating all of the armatures with the said wheels.

10. In a locomotive, the combination with a driving axle and a quill and a pair of driving wheels mounted on said axle, of a pair of motors mounted on said quill and means for transmitting the driving effort of said motors through the quill to the driving wheels.

11. In a locomotive, the combination with a driving axle and a quill and a pair of driving wheels mounted on said axle, of a pair of twin motors mounted on said quill, and means for resiliently transmitting the driving effort of said motors through said quill to the driving wheels.

12. In a locomotive, the combination with a pair of twin motors each comprising a unitary shell frame and a pair of armatures disposed within the shell frame, of a driving axle, a pair of driving wheels mounted on said axle, means for mounting said motors on the driving axle and means for transmitting the driving effort of said armatures to the driving wheels.

13. In a locomotive, the combination with a pair of twin motors each comprising a pair of armatures disposed within a unitary shell frame and means for rigidly securing said motors together, of a driving axle and a quill disposed between said motors, driving wheels mounted on said axle, means for connecting the armatures of the motors to said quill, and means for transmitting the driving effort of the motors through said quill to the driving wheels.

14. In a locomotive, the combination with a pair of twin motors each comprising a unitary shell frame, and a pair of armatures disposed within the said frame, of a driving axle, a pair of driving wheels mounted on the axle, means for mounting said motors on said driving axle, and resilient means for transmitting the driving effort of said armatures to the driving wheels.

In testimony whereof, I have hereunto subscribed my name this 3rd day of Aug. 1915.

NORMAN W. STORER.